US012767258B2

(12) United States Patent
Lozonne

(10) Patent No.: US 12,767,258 B2
(45) Date of Patent: Oct. 20, 2026

(54) ADJUSTABLE HEIGHT OR DROPPER SEATPOST

(71) Applicant: SELLE ROYAL USA, INC., San Clemente, CA (US)

(72) Inventor: Jared William Lozonne, Laguna Beach, CA (US)

(73) Assignee: SELLE ROYAL USA, INC., San Clemente, CA (US)

( * ) Notice: Subject to any disclaimer, the term of this patent is extended or adjusted under 35 U.S.C. 154(b) by 351 days.

(21) Appl. No.: 18/513,037

(22) Filed: Nov. 17, 2023

(65) Prior Publication Data

US 2025/0162672 A1 May 22, 2025

(51) Int. Cl.
*B62J 1/08* (2006.01)

(52) U.S. Cl.
CPC ............ *B62J 1/08* (2013.01); *B62J 2001/085* (2013.01)

(58) Field of Classification Search
CPC .............................. B62J 1/08; B62J 2001/085
See application file for complete search history.

(56) References Cited

U.S. PATENT DOCUMENTS

| | | | | |
|---|---|---|---|---|
| 5,062,617 | A * | 11/1991 | Campbell | B62J 1/02 267/132 |
| 9,376,159 | B2 * | 6/2016 | Kuo | B62K 19/36 |
| 9,415,824 | B2 * | 8/2016 | Maier | B62K 19/36 |
| 10,974,781 | B2 * | 4/2021 | Staples | B62J 1/08 |
| 11,312,442 | B2 * | 4/2022 | Shimazu | B62J 43/13 |
| 11,364,963 | B2 * | 6/2022 | Staples | B62K 19/36 |
| 11,673,622 | B2 * | 6/2023 | Lin | B62J 1/08 297/215.14 |
| 11,679,829 | B1 * | 6/2023 | Miles | B62J 1/06 297/215.14 |
| 11,745,817 | B2 * | 9/2023 | Coaplen | B62J 1/08 297/215.14 |
| 12,233,975 | B2 * | 2/2025 | Dubois | B62J 1/08 |
| 12,403,970 | B2 * | 9/2025 | Watson | B62J 45/423 |
| 12,441,421 | B2 * | 10/2025 | Hoffmann | B62J 1/08 |
| 12,485,986 | B2 * | 12/2025 | Morelli | B62J 1/08 |
| 2015/0145294 | A1 * | 5/2015 | Kench, III | B62K 19/36 297/215.13 |
| 2021/0094642 | A1 * | 4/2021 | Dubois | B62J 1/06 |
| 2025/0162671 | A1 * | 5/2025 | Holaday | B62J 1/08 |

FOREIGN PATENT DOCUMENTS

| | | | | |
|---|---|---|---|---|
| CN | 108482537 A * | 9/2018 | | B62J 1/08 |
| CN | 110126944 A * | 8/2019 | | B62J 1/08 |
| CN | 114394185 A * | 4/2022 | | B62J 1/08 |
| DE | 102004009927 A1 * | 9/2005 | | B62J 1/08 |
| EP | 3069969 A1 * | 9/2016 | | B62K 19/36 |
| EP | 4610153 A1 * | 9/2025 | | B62J 1/08 |
| KR | 20090011668 U * | 11/2009 | | B62H 5/001 |
| KR | 20110005678 U * | 6/2011 | | B62J 1/08 |
| WO | WO-2011059155 A1 * | 5/2011 | | B62K 21/22 |

* cited by examiner

*Primary Examiner* — Timothy J Brindley
(74) *Attorney, Agent, or Firm* — Tutunjian & Bitetto, P.C.

(57) ABSTRACT

The present invention relates to an adjustable height or dropper seatpost for a bicycle including an upper, in use, tube, and a lower, in use, tube, with the upper tube being slidingly mounted in the lower tube.

16 Claims, 5 Drawing Sheets

ADJUSTABLE HEIGHT OR DROPPER SEATPOST

TECHNICAL FIELD OF THE INVENTION

The present invention relates to an adjustable height or dropper seatpost for a bicycle as well as a bicycle including such seatpost.

STATE OF THE ART

A number of adjustable height seatposts have been proposed so far. Recent trends are requiring the most amount of seatpost travel to be accomplished in the shortest overall axial length. In addition to short overall axial length, current market trends are for longer travel and adjustable travel limits.

Requirements for adjustable travel limiting are becoming more common in the marketplace. This requirement allows riders to achieve the maximum amount of travel that can be accommodated by their saddle height and frame geometry.

Current embodiments require a spacer of either radial or axial orientation that must be carefully removed and aligned in order to achieve the desired travel limit adjustment. In other embodiments, spacers must be added or subtracted from the system. In this respect, current designs create additional friction on the system which can seize the seatpost's ability to raise and lower. It also can be a complex operation for the end user.

SUMMARY OF THE INVENTION

It is therefore a principal object of the present invention to provide a new adjustable height or dropper seatpost.

Another object of the present invention is to provide a seatpost with a new travel limit adjustment system.

Another object of the present invention is to provide a seatpost with a travel limit adjustment system making it possible to vary the travel of the seatpost in a simple and rapid manner.

According to the present invention an adjustable height or dropper seatpost as described in the present application is provided.

According to the present invention a bicycle as described in the present application is provided.

The present application refers to preferred and advantageous embodiments of the invention.

BRIEF DESCRIPTION OF THE DRAWINGS

These and other advantages will be better understood by any man skilled in the art from the following description and from the attached drawings, given as a not-limiting example, in which.

DETAILED DESCRIPTION

Figure 1:
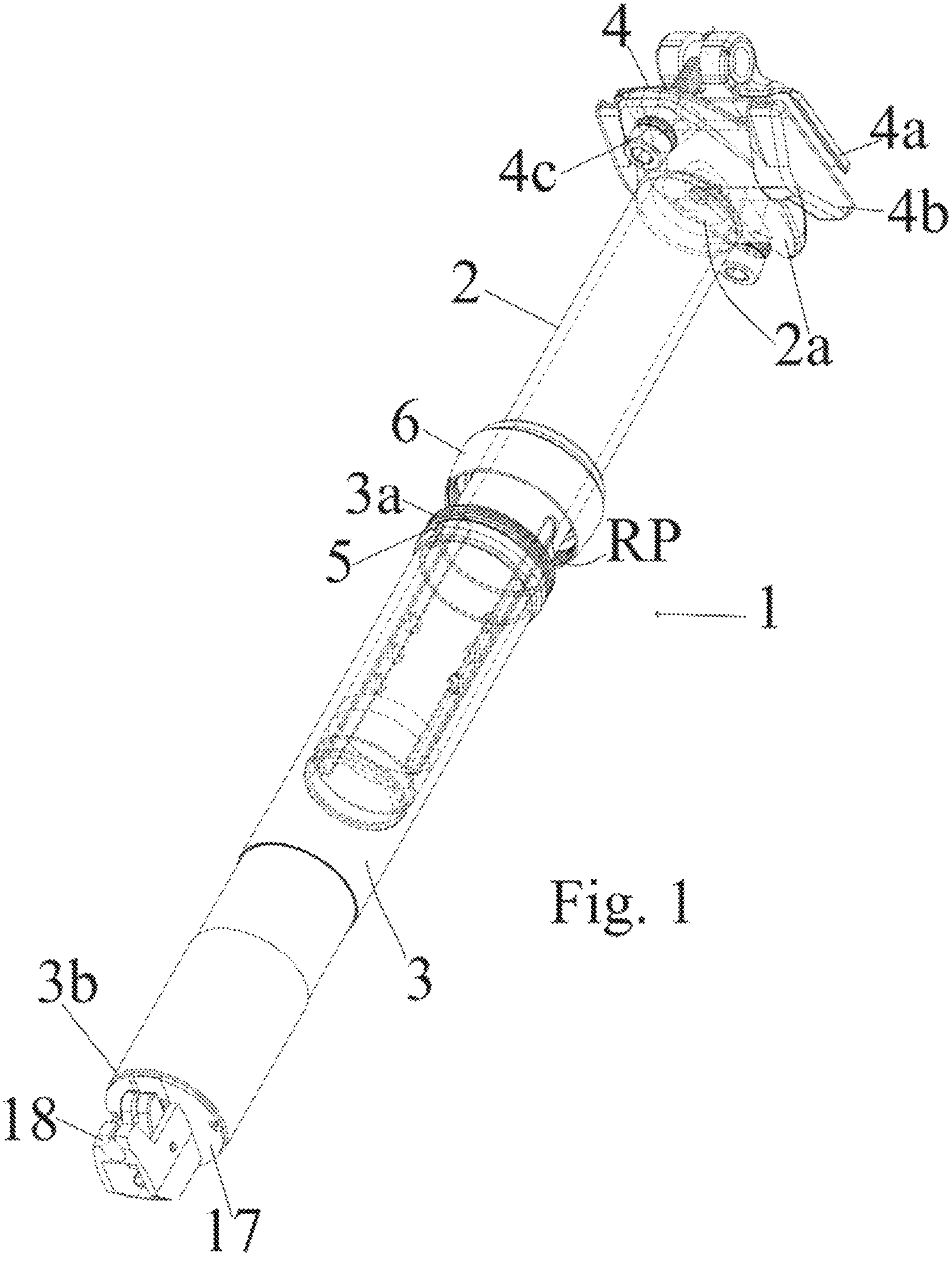
FIG. 1 is a perspective view of an adjustable height seatpost for a bicycle in accordance with the present invention.
Figure 2:
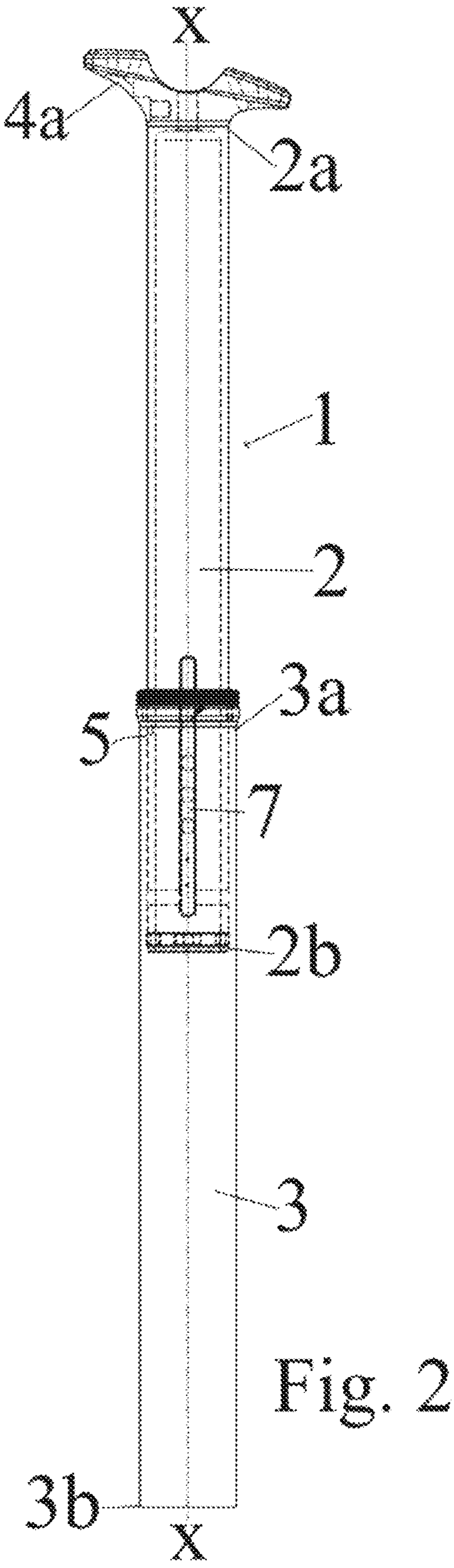
FIGS. 2 and 3 show the adjustable height seatpost of FIG. 1 in an extended and retracted position, respectively.
Figure 3:
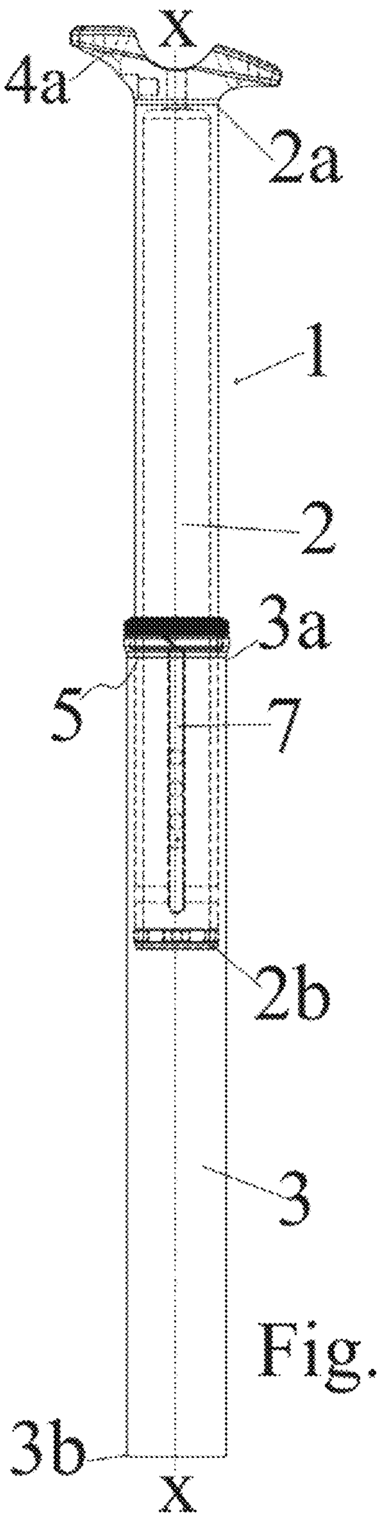
Figure 4:
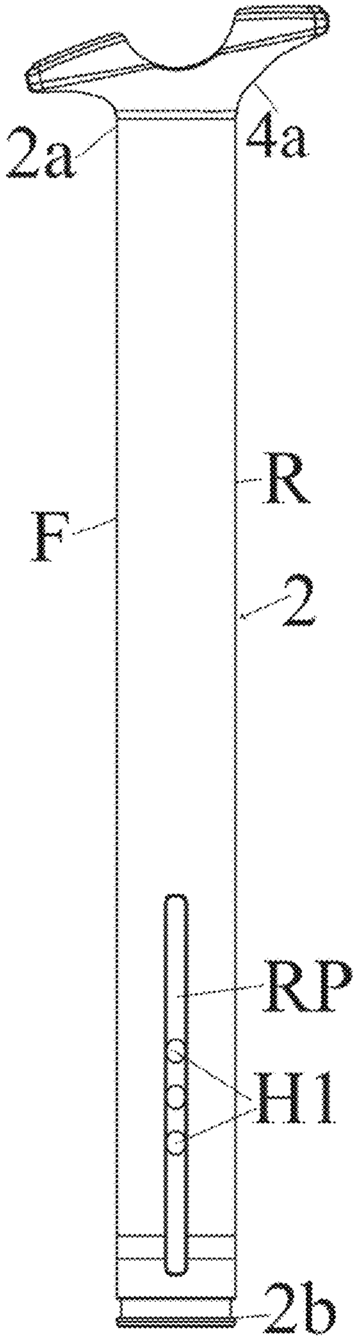
FIGS. 4 to 6 are side, front, and side views, respectively of an upper tube of the adjustable height seatpost of FIG. 1.
Figure 5:
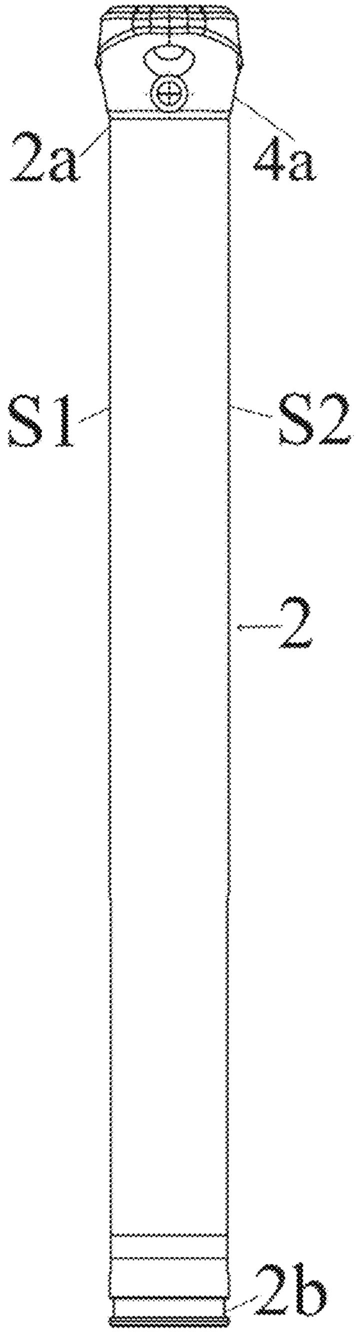
Figure 6:
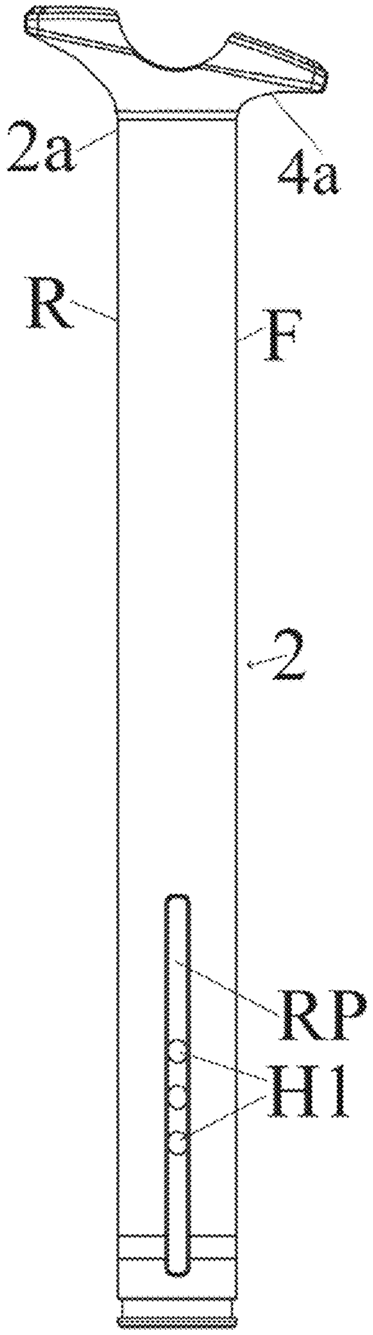

The present invention relates to an adjustable height or dropper seatpost 1 for a bicycle including an upper, in use, tube or quill 2 and a lower, in use, tube or seatpost body 3, with the upper tube 2 being slidingly mounted, owing to the action of an actuator, in the lower tube 3 along a longitudinal axis x-x between a retracted position (FIG. 3), in which the length of the seatpost 1 is minimum, and an extended or extracted position (FIG. 2), in which the length (i.e. the distance among the upper end 2*a* of the upper tube 2 and the lower end 3*b* of the lower tube 3) of the seatpost is maximum.

In this respect, the upper 2 and lower 3 tube are preferably shaped as a solid of rotation around an axis of symmetry, which axis corresponds to the longitudinal axis x-x. Of course, the cross-section of the upper 2 and lower 3 tube is preferably circular.

The upper end or head 2*a* of the upper tube 2 is designed to house or engage or belong to seat clamps or connector 4 for connecting the seatpost 1 to a bicycle seat. Preferably, the seat clamps or connector, in use, are/is supported by and integral in vertical translation with the upper tube or quill 2.

The seat clamps or connector 4 can be structured and connected or fitted to the upper tube or quill 2 in any suitable manner. In this respect, they can include a pair of clamps or jaws 4*a*, 4*b* with means for approaching or moving apart 4*c* the clamps or jaws, such as screws, bolts or the like. The seat clamps or connector 4 can define one or two housing for receiving and clamping, owing to the action of the means for approaching or moving apart 4*c*, the fork of a bicycle seat or saddle or the prongs thereof. The upper end or head 2*a* could correspond to one of such clamp or jaw or it can be integral in vertical displacement or made in a single piece with it.

Moreover, the lower tube 3 has an upper end 3*a* and a lower end 3*b*, with the upper end 3*a* of the lower tube 3 or a component integral or mounted thereon defines at least one shoulder 5 protruding inwardly, which shoulder 5 faces, in use, downwards, whereas the seatpost 1 comprises at least one abutment component 7 integral with the upper tube 2 and designed to abut against the shoulder 5 when the upper tube 2 and the lower tube 3 are mutually displaced (or rather the upper tube 2 is displaced), owing to an actuator, so as to bring them to the extended position.

Thus, the at least one abutment component 7 acts as travel limiting system or component or end-of-the stroke component.

The shoulder 5 is preferably delimited by a component integral or mounted or fitted on or in the upper end 3*a* of the lower tube 3, for example a bushing, sleeve, nut or the like. Optionally, an annular collar 6 can also be provided, which is engaged, for example screwed on the upper end 3*a* and is designed to secure the bushing, sleeve, nut mounted in the upper end 3*a* and defining the shoulder 5.

Advantageously, the shoulder 5 is annular-shaped or ring-shaped, even if two or more shoulders 5 (not ring-shaped) angularly shaped from each other but at the same height or portion or length of the lower tube 3 can also be provided.

Furthermore, the upper tube or quill 2 delimits at least one slot or recessed portion RP and the abutment component comprises or rather consists of at least one slat or key or rod 7 firmly and removably fitted or fittable or inserted or insertable in a respective slot or recessed portion RP and designed to protrude outwardly from the latter for abutting against the shoulder 5 as soon as the upper tube 2 and the lower tube 3 are mutually brought or rather when the upper tube 2 is brought (owing to the action of an actuator) to the extended position.

The expression "firmly and removably" means that the slat or key or rod 7 can be inserted or fitted in the slot or recessed portion RP so as be substantially fixed in a stable position, but with a proper force of detachment (for example applied manually) the same can be removed from the slot or recessed portion RP and reinserted firmly in another position or arrangement.

Moreover, the position and/or arrangement of the at least one slat or key 7 in the at least one slot or recessed portion RP is adjustable, so that it is possible to change the extended position and, in turn, the maximum length of the seatpost 1 and thus the maximum height for a seat or saddle.

Advantageously, the at least one slot or recessed portion RP is not-through across the thickness of the upper tube 2 and the latter delimits one or a plurality of holes H1, preferably through so that it/them open/s inside the axial opening defined by the upper tube 2, extending from the slot or recessed portion RP inwardly, whereas the at least one slat or key 7 includes a main section 7*a* as well as at least one lug or protrusion 7*b* extending from the main section 7*a*, with the main section insertable or fittable, for example substantially to size, in the slot or recessed portion RP, even if the length of the main section 7*a* is lower than the slot or recessed portion RP, while the lug or protrusion 7*b* is insertable or fittable, for example substantially to size or owing to a forced insertion, in the at least one hole H1.

In such case, the firm and removable insertion or fit can be due to the engagement or interference fit or press fit among lug or protrusion 7*b* and hole H1 only, optionally in addition to the engagement or interference fit or press fit among main section 7*a* or the sides thereof and the slot or recessed portion RP.

More advantageously, the seatpost 1 delimits at least two or three holes H1 and the main section 7*a* is insertable or fittable in the slot or recessed portion RP, while the lug or protrusion 7*b* is insertable or fittable in each of the two or three holes H1, so that, depending on the hole H1 engaged by the lug or protrusion 7*b* the position of the at least one slat or key 7 or rather of the main section 7*a* thereof in the slot or recessed portion RP is adjusted, so that it is possible to change the extended position, and thus the travel or end-of-the stroke of the seatpost 1.

According to the not-limiting embodiment shown in the figures, the holes are at a distance from each other ranging between 10 mm and 20 mm.

Moreover, the holes H1 are a given distance from the ends of the slot or recessed portion RP, for example ranging from 25 mm and 55 mm.

If desired, the lug or protrusion 7*b* is at a first distance from a first end 7*c* of the slat or key 7 and at a second distance from a second end 7*d* of the at least one slat or key or rod 7 lower than the first distance, so that depending on the position of the first and second end of the at least one slat or key or rod 7 in the slot or recessed portion RP the extended position is changed. Of course, the second end 7*d* is opposite to the first end 7*c* and the direction from the first 7*c* to the second 7*d* end defines the direction of main extension of the slat or key or rod 7.

The distance of the lug or protrusion from the first end 7*c* ranges between 10 mm and 30 mm, whereas the distance of the lug or protrusion from the second end 7*d* ranges between 30 mm and 50 mm.

Figure 7:
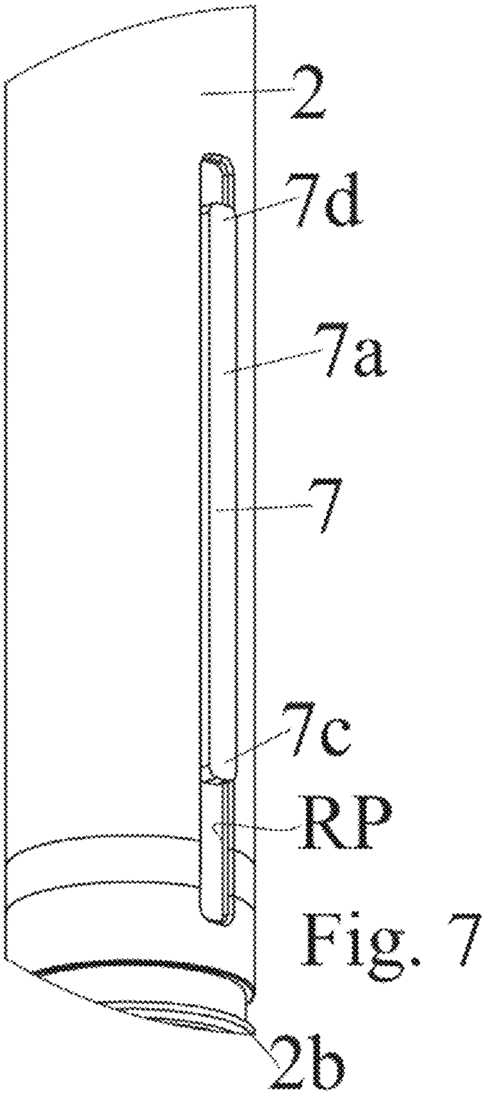
FIG. 7 is a detail on an enlarged view of the upper tube of FIGS. 4 to 6, FIGS. 8 and 9 are top and perspective views, respectively of a slat or key or rod of the adjustable height seatpost of FIG. 1.
Figure 8:
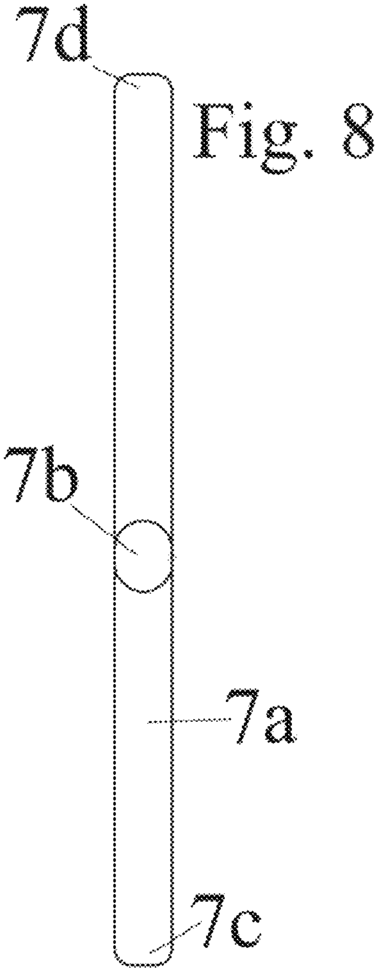
Figure 9:
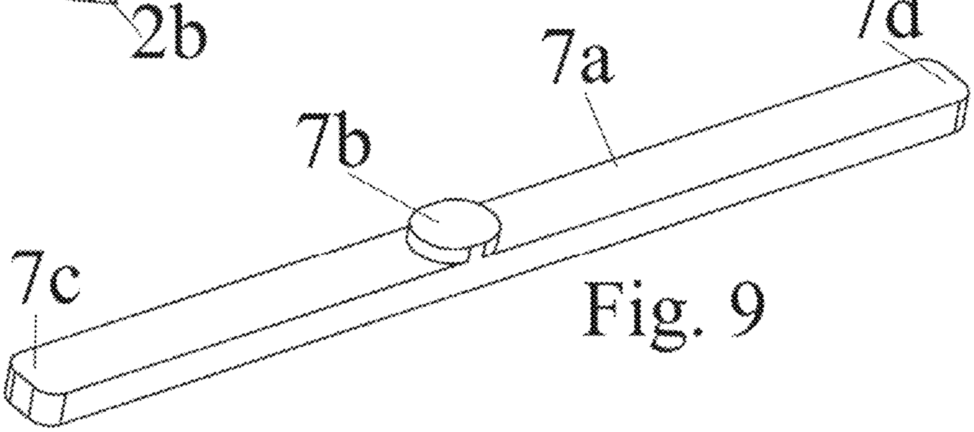
Figure 10:
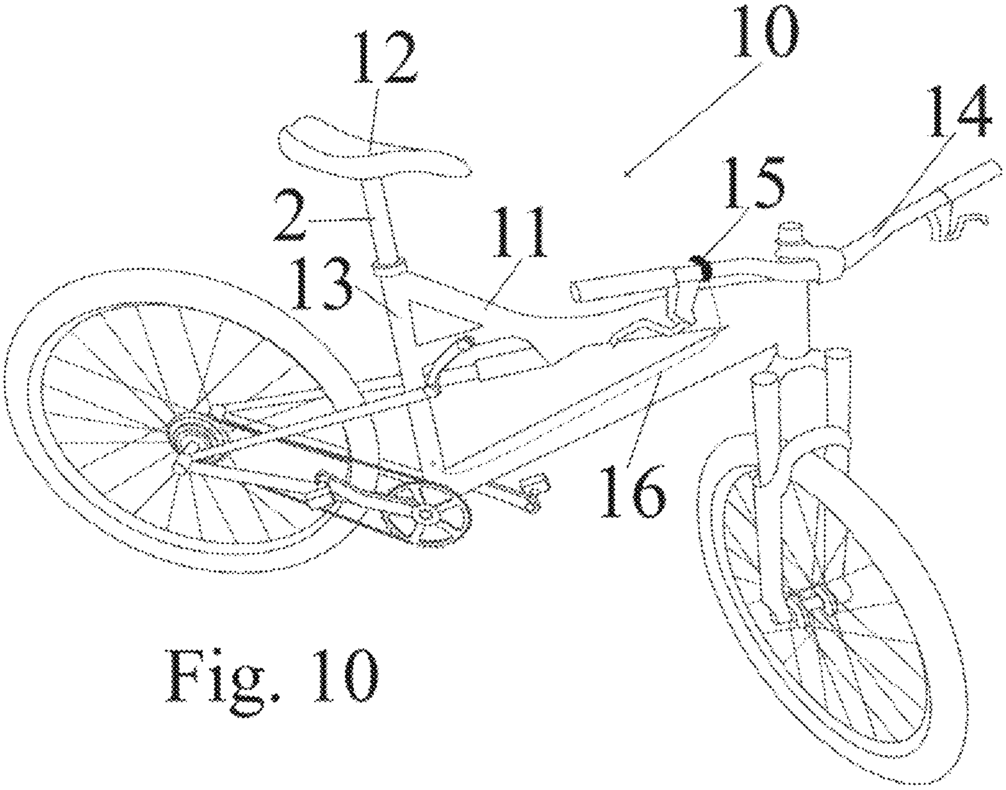
FIG. 10 is a schematic view of a bicycle according to the present invention with a lever and a cable for controlling an actuator mechanism of an adjustable height seatpost.

In this respect, if the at least one slat or key or rod 7 is arranged with the main section 7*a* inserted in the slot or recessed portion RP and the lug or protrusion 7*b* is inserted in a given hole H1,

- according to a first arrangement, the respective first end 7*c* could be arranged closer to the lower end 2*b* of the upper tube or quill 2, in which case the second end 7*d* would actually constitute the abutment portion against the shoulder 5 (see FIG. 7), or
- according to a second arrangement, the respective second end 7*d* could be arranged closer to the lower end 2*b* of the upper tube or quill 2, in which case the first end 7*c* would actually constitute the abutment portion against the shoulder 5.

Of course, the maximum length of the seatpost (and thus the maximum height of the seat) according to the first arrangement is greater than the maximum length of the seatpost (and thus the maximum height of the seat) according to the second arrangement, owing to the fact that the distance among the first end 7*c* and the lug or protrusion 7*b* is lower than the distance between the second end 7*d* and the lug or protrusion 7*b*.

This applies to all the holes H1, and thus if two holes H1 are provided, four different maximum lengths of the seatpost 1 (and thus four maximum heights for the seat) are available, i.e. two lengths with the first arrangement, i.e. with the main section 7*a* inserted in the slot or recessed portion RP and the lug or protrusion 7*b* insertable in the first hole H1 or in the second hole H1, and two lengths with the second arrangement, i.e. with the main section 7*a* inserted in the slot or recessed portion RP and the lug or protrusion 7*b* insertable in each of the holes H1.

If instead three holes H1 are provided, six different maximum lengths of the seatpost 1 (and thus six maximum heights for the seat) are available.

Of course, the expression "maximum length" means the distance among the upper end 2*a* of the upper tube 2 (and thus the seat clamps or connector 4, and, in turn, the seat or saddle) and the lower end 3*b* of the lower tube 3 when the upper tube 2 is in the extended or extracted position.

With reference to the not limiting embodiment shown in the figure, the at least one slot or recessed portion RP is straight and has a dimension of main extension parallel to the longitudinal axis x-x of the respective upper tube 2, and the at least one slat or key 7 is straight too, and thus, in use or when inserted or fitted in the slot or recessed portion 7, the at least one slat or key or rod 7 is with the respective dimension of main extension preferably parallel to the longitudinal axis.

The length of the slat or key or rod 7 or rather of the main section 7*a* thereof is lower, for example of an amount among 1 and 4 cm, than the slot or recessed portion RP, in such a manner that the main section 7*a* is entirely inserted or mounted within the slot or recessed portion RP in any assembling position or arrangement, i.e. with the respective lug or protrusion 7*b* mounted in each of the holes H1 and/or optionally with any arrangement of the slat or key or rod 7, i.e. with the first or second end at a position upper than the other (second or first end).

Moreover, the or a slot or recessed portion RP has a given depth, for example about 0.5 and 3 mm, whereas the or a respective slat or key or rod 7 has a thickness greater, for example greater of about 0.5-3 mm, than the slot or recessed portion RP, so that the slat or key or rod 7 can be partly received in the slot or recessed portion and partly protrude from the latter.

The width instead of the slot or recessed portion RP is substantially equal or preferably slightly greater, for example among 0.1 and 2 mm, than the width of the slat or key or rod 7.

Of course, the seatpost 1 can including an actuator, such a hydraulic, oleodynamic or the like cylinder-piston unit, mounted inside the upper 2 and lower 3 tubes and designed to displace, upon suitable mechanical and/or electronical control (in a known manner), the upper tube or quill 2 among the retracted and the extended position.

Preferably, the upper tube 2 delimits two slots or recessed portions RP extending on parts opposite to one another of the same tube 2, with two slats or keys or rods 7 each inserted or fitted in a respective slot or recessed portion RP.

In such case, the two slots or recessed portions have, for example, the same length and size and are preferably substantially aligned to each other, i.e. at the same distance from the ends 2*a*, 2*b* and extending at positions angularly shaped of about 180° about the upper tube 2.

Of course, the upper 2 or lower 3 tube comprises a front F, a rear R and two sides S1, S2, with the upper end or head 2*a* of the upper tube 2 being designed to house or engage or belong to seat clamps or connector 4 for connecting the seatpost 1 to a bicycle seat or saddle, so that the latter is arranged with the direction from the back to the tip thereof parallel to the direction from the rear to the front of the seatpost.

Preferably, the at least one slot or recessed portion RP is or departs at a distance among 0.5 cm and 3 from the lower end 2*b* of the upper tube 2.

Subject-matter of the present invention is also a bicycle 10 having a frame 11, a seat or saddle 12 and an adjustable height seatpost 1. In such case, the frame 11 includes at least one tubular component 13 with the lower tube 3 of the adjustable height seatpost 1 mounted therein, whereas the seat or saddle 12 is connected to the seat clamps or connector 4 housed or engaged or including the upper end or head 2*a* of the upper tube 2.

The tubular component 13 could have a respective longitudinal axis vertical or slightly inclined with respect to the vertical, and thus the seatpost 1 could be, in use, substantially vertical or slightly inclined with respect to the vertical, although, in an attempt to render the present description more manageable, we will refer to the term "vertical" only, although the "slightly inclined" option should be considered as included in the scope of this patent document.

Of course, the bicycle can comprise a handlebar 14 as well as a component for activating/deactivating the actuator, a remote lever 15 or button control mounted thereon or on another component of the frame and suitable for controlling the displacement of the upper tube of the adjustable height seatpost between the retracted position and the extended position and vice versa or rather for controlling the actuator, for example through a suitable cable 16.

As a not limitative example, the seatpost 1 can comprise a closing component 17 of the lower, in use, end 3*b* of the lower tube 3, whereas the actuator mechanism includes a lever component 18 and the cable 16 received in a respective housing or sheath, with a lower end of the cable 16 being fixed or attached in the closing component 17, whereas the housing or sheath of the cable 16 acts against the lever component 18, while the second or upper end of the cable 16 is connected to the remote lever 15 or button control, whereas the other end of the housing or sheath is mounted or connected to the handlebar 14 or to another component of the frame 11 of the bicycle 10. With such an arrangement, as soon as the upper end of the cable 16 is pulled, owing to the action of a user by a remote lever 15 or button control on the upper end of the cable 16, the housing of the latter determines the displacement of the lever component 18 and thus the engagement or actuation of the actuator.

As it will be appreciated, owing to the present invention, it is possible to adjust the travel or length of the seatpost or rather in the extended position and thus the maximum height for the saddle or seat in a simple and rapid manner.

In this respect, according to the need of a user, the length or travel of the seatpost in the extended position can be varied as a function of the hole H1 engaged by the lug or protrusion 7*b* and/or as a function of the arrangement of the slat or key or rod 7, i.e. with the first end 7*c* closer than the second end 7*d* to the lower end 2*b* or to the upper end 2*a*.

To this regard, this adjustment can be made before the final step of assembling or inserting the quill 2 in the seatpost body 3, and of course, before the latter is inserted or fixed in position in the tubular component 13.

The invention claimed is:

1. An adjustable height or dropper seatpost for a bicycle including:

an upper, in use, tube, the upper end or head of the upper tube being designed to house or engage or belong to seat clamps or connector for connecting the seatpost to a bicycle seat, a lower, in use, tube, with the upper tube being slidingly mounted in the lower tube along a longitudinal axis between a retracted position, in which the length of the seatpost is minimum and an extended position, in which the length of the seatpost is maximum, the upper end of said lower tube or a component integral or mounted thereon defining a shoulder protruding inwardly, whereas said seatpost comprises at least one abutment component integral with the upper tube and designed to abut against said shoulder when said upper tube and said lower tube are mutually displaced so as to bring them to the extended position, wherein said upper tube delimits at least one slot or recessed portion and said abutment component comprises at least one slat or key or rod firmly and removably fitted or fittable or inserted or insertable in a respective slot or recessed portion and designed to protrude outwardly from the latter for abutting against said shoulder as soon as said upper tube and said lower tube are mutually brought to said extended position, the position and/or arrangement of said at least one slat or key or rod in said slot or recessed portion being adjustable, so that it is possible to change the extended position and, in turn, the maximum length of the seatpost, wherein said at least one slot or recessed portion is not-through across the thickness of the respective upper tube and wherein the latter delimits one or a plurality of holes extending from said slot or recessed portion inwardly, whereas said at least one slat or key or rod includes a main section as well as a lug or protrusion extending from said main section, with the main section insertable or fittable in said at least one slot or recessed portion while said lug or protrusion is insertable or fittable in said at least one hole, and wherein said lug or protrusion is at a first distance from a first end of said slat or key or rod and at a second distance from a second end of said at least one slat or key or rod lower than said first distance, so that depending on the position of the first and second end of said at least one slat or key or rod in said slot or recessed portion the extended position is changed.

2. The seatpost according to claim 1, wherein said seatpost delimits at least two or three holes and wherein said main section is insertable or fittable in said slot or recessed portion, while said lug or protrusion is insertable or fittable in each of said holes, so that depending on the hole engaged by said lug or protrusion the position of said main section in said slot or recessed portion is adjusted, so that it is possible to change the extended position.

3. The seatpost according to claim 2, wherein said holes are at a distance from each other ranging between 10 mm and 20 mm.

4. The seatpost according to claim 2, wherein said holes are at a distance from the ends of said at least one slot or recessed portion ranging from 25 mm and 55 mm.

5. The seatpost according to claim 1, wherein the distance of the lug or protrusion from the first end ranges between 10 mm and 30 mm, whereas the distance of the lug or protrusion from the second end ranges between 30 mm and 50 mm.

6. The seatpost according to claim 1, wherein the firm and removable insertion or fit of said at least one slat or key or rod in a respective slot or recessed portion is due to the engagement or interference fit or press fit among said at least one lug or protrusion and said at least one hole only, optionally in addition to the engagement or interference fit or press fit among said main section and said at least one the slot or recessed portion.

7. The seatpost according to claim 1, wherein the length of said main section of said at least one slat or key or rod is lower than the length of said at least one slot or recessed portion, in such a manner that the main section is entirely inserted or mounted within the slot or recessed portion in any assembling position or arrangement of the slat or key or rod in said at least one slot or recessed portion.

8. The seatpost according to claim 1, wherein said at least one slot or recessed portion is straight and has a dimension of main extension parallel to the longitudinal axis of the respective upper tube, and wherein said at least one slat or key or rod is straight too.

9. The seatpost according to claim 1, wherein said two slots or recessed portions have the same length and size and are substantially aligned to each other.

10. The seatpost according to claim 1, wherein said upper or lower tube comprises a front, a rear and two sides, with the upper end or head of the upper tube being designed to house or engage or belong to seat clamps or connector for connecting the seatpost to a bicycle seat, so that the latter is arranged with the direction from the back to the tip thereof parallel to the direction from the rear to the front of the seatpost.

11. The seatpost according to claim 1, wherein said at least one slot or recessed portion is or departs at a distance among 0.5 cm and 3 from the lower end of said upper tube.

12. A bicycle having a frame, a seat and an adjustable height seatpost as claimed in claim 1, said frame including at least one tubular component with the lower tube of the adjustable height seatpost mounted therein, said seat being instead connected to said seat clamps or connector housed or engaged or including the upper end or head of the upper tube.

13. The bicycle as claimed in claim 12, comprising a handlebar as well as a component for activating/deactivating an actuator, a remote lever or button control mounted thereon or on another component of the frame and suitable for controlling the displacement of said upper tube of said adjustable height seatpost between said retracted position and said extended position and vice versa.

14. An adjustable height or dropper seatpost for a bicycle including:

an upper, in use, tube, the upper end or head of the upper tube being designed to house or engage or belong to seat clamps or connector for connecting the seatpost to a bicycle seat, a lower, in use, tube, with the upper tube being slidingly mounted in the lower tube along a longitudinal axis between a retracted position, in which the length of the seatpost is minimum and an extended position, in which the length of the seatpost is maximum, the upper end of said lower tube or a component integral or mounted thereon defining a shoulder protruding inwardly, whereas said seatpost comprises at least one abutment component integral with the upper tube and designed to abut against said shoulder when said upper tube and said lower tube are mutually displaced so as to bring them to the extended position, wherein said upper tube delimits at least one slot or recessed portion and said abutment component comprises at least one slat or key or rod firmly and removably fitted or fittable or inserted or insertable in a respective slot or recessed portion and designed to protrude outwardly from the latter for abutting against said shoulder as soon as said upper tube and said lower tube are mutually brought to said extended position, the position and/or arrangement of said at least one slat or key or rod in said slot or recessed portion being adjustable, so that it is possible to change the extended position and, in turn, the maximum length of the seatpost, and wherein said at least one slot or recessed portion has a depth of about 0.5 and 3 mm, whereas said at least one slat or key or rod has a thickness greater of about 0.5-3 mm than the slot or recessed portion, so that the slat or key or rod can be partly received in the slot or recessed portion and partly protrude from the latter.

15. An adjustable height or dropper seatpost for a bicycle including:

an upper, in use, tube, the upper end or head of the upper tube being designed to house or engage or belong to seat clamps or connector for connecting the seatpost to a bicycle seat, a lower, in use, tube, with the upper tube being slidingly mounted in the lower tube along a longitudinal axis between a retracted position, in which the length of the seatpost is minimum and an extended position, in which the length of the seatpost is maximum, the upper end of said lower tube or a component integral or mounted thereon defining a shoulder protruding inwardly, whereas said seatpost comprises at least one abutment component integral with the upper tube and designed to abut against said shoulder when said upper tube and said lower tube are mutually displaced so as to bring them to the extended position, wherein said upper tube delimits at least one slot or recessed portion and said abutment component comprises at least one slat or key or rod firmly and removably fitted or fittable or inserted or insertable in a respective slot or recessed portion and designed to protrude outwardly from the latter for abutting against said shoulder as soon as said upper tube and said lower tube are mutually brought to said extended position, the position and/or arrangement of said at least one slat or key or rod in said slot or recessed portion being adjustable, so that it is possible to change the extended position and, in turn, the maximum length of the seatpost, and further comprising an actuator mounted inside said upper and lower tubes and designed to displace said upper tube among said retracted and said extended position.

16. An adjustable height or dropper seatpost for a bicycle including:

an upper, in use, tube, the upper end or head of the upper tube being designed to house or engage or belong to seat clamps or connector for connecting the seatpost to a bicycle seat, a lower, in use, tube, with the upper tube being slidingly mounted in the lower tube along a longitudinal axis between a retracted position, in which the length of the seatpost is minimum and an extended position, in which the length of the seatpost is maximum, the upper end of said lower tube or a component integral or mounted thereon defining a shoulder protruding inwardly, whereas said seatpost comprises at least one abutment component integral with the upper tube and designed to abut against said shoulder when said upper tube and said lower tube are mutually displaced so as to bring them to the extended position, wherein said upper tube delimits at least one slot or recessed portion and said abutment component comprises at least one slat or key or rod firmly and removably fitted or fittable or inserted or insertable in a respective slot or recessed portion and designed to protrude outwardly from the latter for abutting against said shoulder as soon as said upper tube and said lower tube are mutually brought to said extended position, the position and/or arrangement of said at least one slat or key or rod in said slot or recessed portion being adjustable, so that it is possible to change the extended position and, in turn, the maximum length of the seatpost, and wherein said upper tube delimits two slots or recessed portions extending on parts opposite to one another of the upper tube, with two slats or keys or rods each inserted or fitted in a respective slot or recessed portion.

* * * * *